(12) United States Patent
Nishino et al.

(10) Patent No.: US 6,487,065 B1
(45) Date of Patent: Nov. 26, 2002

(54) MULTILAYER CERAMIC CAPACITOR AND MANUFACTURING METHOD THEREOF

(75) Inventors: Takayuki Nishino, Takefu (JP); Toshiki Nishiyama, Takefu (JP); Yasunobu Yoneda, Takefu (JP)

(73) Assignee: Murata Manufacturing Co. Ltd.

( * ) Notice: Subject to any disclaimer, the term of this patent is extended or adjusted under 35 U.S.C. 154(b) by 0 days.

(21) Appl. No.: 10/086,369

(22) Filed: Mar. 4, 2002

(30) Foreign Application Priority Data

Mar. 7, 2001 (JP) .......................................... 2001-063837

(51) Int. Cl.[7] ................................................. H01G 4/12
(52) U.S. Cl. ................................ 361/321.2; 361/321.4; 501/134; 501/138; 501/139
(58) Field of Search .................................. 361/311, 312, 361/313, 321.1, 321.2, 321.3, 321.4; 29/25.41, 25.42; 501/134, 135, 136, 137, 138, 139

(56) References Cited

U.S. PATENT DOCUMENTS 5,258,150 A * 11/1993 Merkel et al. .......... 264/177.12
6,301,092 B1 * 10/2001 Hata et al. ................ 361/306.3

FOREIGN PATENT DOCUMENTS

| JP | 63-126117 | | 5/1988 |
| JP | 8-45343 | * | 2/1996 |
| JP | 2000-252156 | * | 9/2000 |

* cited by examiner

Primary Examiner—Anthony Dinkins
(74) Attorney, Agent, or Firm—Dickstein, Shapiro, Morin & Oshinsky LLP.

(57) ABSTRACT

A multilayer ceramic capacitor comprises a sintered ceramic compact including primary crystalline phases and secondary phases. The primary crystalline phases mainly contain $CaTiO_3$ and $CaZrO_3$. The secondary phases mainly contain Si and Ca. The amount of Ca in the secondary phase is about 30 mol % or less.

14 Claims, 1 Drawing Sheet

MULTILAYER CERAMIC CAPACITOR AND MANUFACTURING METHOD THEREOF

BACKGROUND OF THE INVENTION

1. Field of the Invention

The present invention relates to methods of manufacturing multilayer ceramic capacitors, and more particularly relates to a multilayer ceramic capacitor formed with a $CaTiO_3/CaZrO3$ ceramic capable of being fired in a neutral or reducing atmosphere.

2. Description of the Related Art

Internal electrodes of ceramic electronic components, such as a multilayer ceramic capacitor, have been formed of base metals, such as Ni and Cu, to reduce the material cost. Since base metals are readily oxidized, ceramics used for multilayer ceramic capacitors including such base metallic internal electrodes need to be fired in a neutral or reducing atmosphere.

Japanese Unexamined Patent Application Publication No.63-126117 discloses a dielectric ceramic composition for temperature compensation capable of being fired in a neutral or reducing atmosphere. The major component of the composition is expressed by the formula $(Ca_{1-x}Sr_x)_m(Zr_{1-y}Ti_y)O_3$, wherein variables x, y and m satisfy $0 \leq x \leq 0.6$, $0 \leq y \leq 0.6$, and $0.85 \leq m \leq 1.30$, respectively. In addition, relative to 100 parts by weight of the major component, 0.5 to 8 parts by weight of MnO2 and 0.5 to 8 parts by weight of glass components containing $TiO_2$, $SiO_2$ and the like are present.

According to this publication, the temperature characteristics of multilayer ceramic capacitors can be extensively controlled by controlling the Ti/Zr ratio of the dielectric ceramic composition. The temperature characteristic of the multilayer ceramic capacitor means the rate of change in capacitance with temperature and generally refers to a temperature coefficient represented by ppm/° C. The temperature coefficient is defined by the following equation:

$$\text{Temperature coefficient} = (C_i - C_0) \times 10^6 / (T_i - T_0)$$

wherein $C_i$ and $C_0$ are capacitances at temperatures $t_i$ and $T_0$, respectively.

The temperature characteristic of a temperature-compensating ceramic capacitor is expressed by a combination of two alphabetical characters, one representing the temperature coefficient and the other representing an allowable error of the temperature coefficient. The dielectric ceramic composition according to the foregoing publication achieves a multilayer ceramic capacitor having a desired temperature characteristic in the range of CG to SL.

CG represents a temperature coefficient of 0 ppm/° C. and a temperature-coefficient allowable error of ±30 ppm/° C., and SL represents a temperature coefficient in the range of +350 to −1000 ppm/° C., as shown in Tables 1 and 2.

TABLE 1

| Character | C | L | P | R | S | T | U | SL |
|---|---|---|---|---|---|---|---|---|
| Temperature coefficient (ppm/° C.) | 0 | −80 | −150 | −220 | −330 | −470 | −750 | −1000 to +350 |

TABLE 2

| Character | K | J | H | G |
|---|---|---|---|---|
| allowable error (ppm/° C.) | ±250 | ±120 | ±60 | ±30 |

Also, the publication discloses that increasing the Ti content improves the temperature characteristic of the ceramic capacitor.

However, multilayer ceramic capacitors formed of $CaTiO_3/CaZrO_3$ are likely to cause a short circuit and a degradation of the insulation resistance (IR) at elevated temperature, as shown in a high-temperature loading test.

SUMMARY OF THE INVENTION

Accordingly, it is an object of the present invention to provide a reliable multilayer $CaTiO_3/CaZrO_3$ ceramic capacitor and a method of manufacturing the same. This multilayer ceramic capacitor rarely exhibits a short circuit or degradation of the insulation resistance in a high-temperature loading test, solving the problem described above.

To this end, according to one aspect of the present invention, there is provided a multilayer ceramic capacitor comprising a sintered ceramic compact comprising primary crystalline phases mainly containing $CaTiO_3$ and $CaZrO_3$ and secondary phases mainly containing Si and Ca. The amount of Ca in the secondary phase is about 30 mol % or less. The multilayer ceramic capacitor also comprises internal electrodes lying in the sintered ceramic compact.

The internal electrodes may comprise a base metal to reduce the material cost of the multilayer ceramic capacitor.

Another aspect of the present invention is directed to a method of manufacturing the multilayer ceramic capacitor. The method comprises preparing a green ceramic laminate comprising main components including $CaTiO_3$ and $CaZrO_3$, sub-components including $MnO_2$ and $SiO_2$, and a plurality of internal electrodes. The method also comprises a step of firing the green ceramic laminate at a heating rate of at least about 5° C./min up to a maximum temperature. Thus, a multilayer ceramic capacitor having high reliability in a high-temperature loading test can be achieved.

DESCRIPTION OF THE PREFERRED EMBODIMENTS

Figure 1:
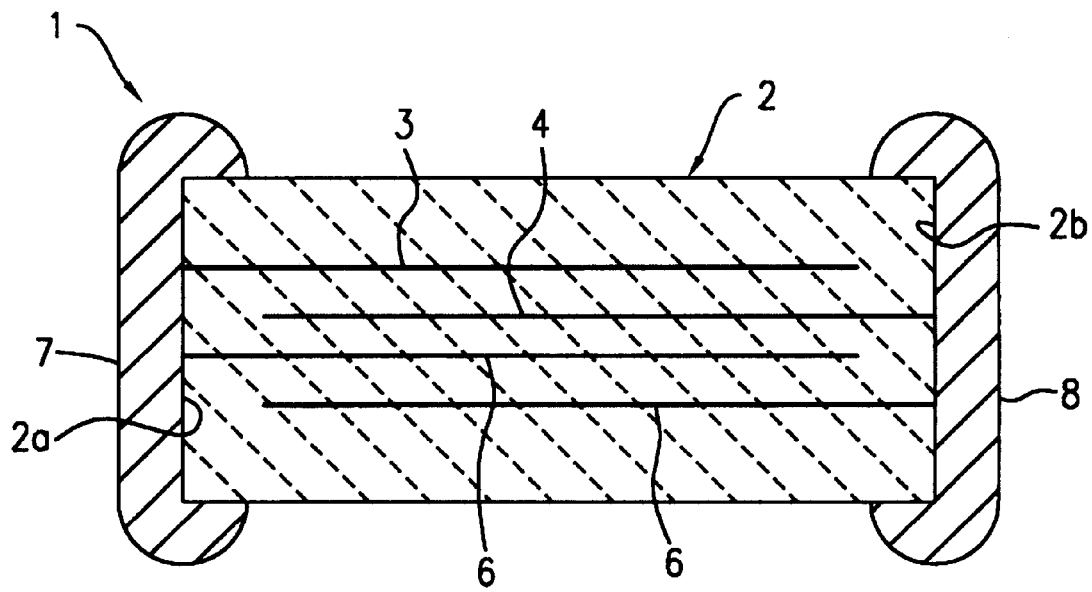
FIG. 1 is a schematic sectional view of a multilayer ceramic capacitor according to an embodiment of the present invention.

Typical embodiments of the present invention will now be described.

A sintered ceramic compact of a multilayer ceramic capacitor according to the present invention has primary crystalline phases mainly containing $CaTiO_3$ and $CaZrO_3$ and secondary phases mainly containing Ca and Si. Such a sintered ceramic compact having these primary and the secondary phases is, for example as disclosed in Japanese Unexamined Patent Application Publication No. 63-126117, prepared by firing a composition containing about 0.5 to 8 parts by weight of $MnO_2$ and about 0.5 to 8 parts by weight of glass components including $TiO_2$ and $SiO2$, relative to 100 parts by weight of main components expressed by the formula $(Ca_{1-x}Sr_x)_m(Zr_{1-y}Ti_y)O_3$ The variables x, y and m in the formula satisfy $0 \leq x \leq 0.6$, $0 \leq y \leq 0.6$, and $0.85 \leq m \leq 1.30$, respectively, and either x or y is not 0.

The glass components include about 30 to 70 mol % (total) $TiO_2$ and $SiO_2$ Further, the glass components include $Li_2O$, RO and $Al_2O_3$, wherein R is at least one element selected from Ba, Sr, Ca and Mg.

In the sintered ceramic compact of the present invention, the secondary phases contain about 30 mol % or less of Ca, thereby improving the reliability in a high-temperature loading test. A concrete example of the present invention will now be described.

A multilayer ceramic capacitor having a length of 2.0 mm, a width of 1.2 mm and a depth of 1.2 mm, was prepared according to the following procedure.

First, calcined $CaZrO_3$ and $CaTiO_3$, $MnO_3$ powder and fine powder containing $SiO_2$ were mixed, and an organic binder and a solvent were added to the mixture to prepare a ceramic slurry. The ceramic slurry contained 1.0 weight percent of a Si—Li sintering accelerator, 1.4 weight percent of $MnO_2$, 10 weight percent of binder and 1.4 weight percent of a plasticizer, relative to 100 weight percent of the calcined $CaZrO_3$ and $CaTiO_3$.

The ceramic slurry was formed into green ceramic sheets having a thickness capable of resulting in a thickness of 5.0 μm after firing. Some of the green ceramic sheets were printed with Ni paste to form an electrode pattern. The pattern-printed green ceramic sheets were laminated, and then other plain green ceramic sheets were laid on the top and bottom surfaces of the laminated green sheets to form a mother laminate. The mother laminate was pressed in the thickness direction, and then was cut into a green ceramic laminate for forming multilayer ceramic capacitors. Each green ceramic laminate had 10 ceramic layers lying between internal electrodes, and hence had 11 internal electrodes.

The green ceramic laminate was fired at a heating rate described below to obtain a sintered ceramic compact. In this instance, the maximum firing temperature was 1300° C.

The heating rate was selected from the following five:
(a) 1.0° C./min
(b) 3.0° C./min
(c) 5.0° C./min
(d) 10.0° C./min
(e) 20.0° C./min After barrel polishing was applied, both ends of each sintered ceramic compact were coated with a Cu paste followed by baking to form external electrodes. One external electrode was provided with a Ni-plated layer and the other external electrode was provided with a Sn-plated layer. Thus, a multilayer ceramic capacitor 1 shown in FIG. 1 was completed.

The multilayer ceramic capacitor 1 comprises a sintered ceramic compact 2 and internal electrodes 3 to 6 lying in the sintered ceramic compact 2. Two sides 2a and 2b, opposing each other, of the sintered ceramic compact 2 have external electrodes 7 and 8, respectively.

The multilayer ceramic capacitor formed according to the steps described above was subjected to a high-temperature loading test and analyzed for the composition.

In the high-temperature loading test, the multilayer ceramic capacitor was subjected to a voltage of 100 V at 150° C. for 200 hours and was examined for evidence of a short circuit and degradation of the insulation resistance.

In the composition analysis, the secondary phase of the multilayer ceramic capacitor was qualitatively analyzed with a scanning electron microscope (SEM) and an energy dispersion X-ray spectrometer (EDX). Results are shown in Table 3.

TABLE 3

| Heating rate (° C./min) | Ca | Si | Mn | Ti | Zr | High-temperature loading |
|---|---|---|---|---|---|---|
| 1.0 | 44.3 | 50.6 | 1.1 | 0.5 | 3.5 | 40/100 |
|  | 41.5 | 53.5 | 1.2 | 0.5 | 3.3 |  |
|  | 43.6 | 50.5 | 1.1 | 0.2 | 4.6 |  |
| 3.0 | 35.1 | 58.6 | 1.3 | 0.3 | 4.7 | 20/100 |
|  | 33.2 | 58.6 | 1.2 | 0.4 | 6.6 |  |
|  | 33.0 | 59.0 | 1.1 | 0.3 | 6.6 |  |
| 5.0 | 30.0 | 62.1 | 1.3 | 0.1 | 6.5 | 0/100 |
|  | 27.2 | 63.0 | 1.3 | 0.2 | 8.3 |  |
|  | 27.5 | 65.1 | 1.4 | ND | 6.0 |  |
| 10 | 28.0 | 62.9 | 1.4 | ND | 7.7 | 0/100 |
|  | 25.1 | 65.7 | 1.4 | ND | 7.8 |  |
|  | 25.0 | 66.8 | 1.3 | ND | 6.9 |  |
| 20 | 26.0 | 64.8 | 1.4 | ND | 7.8 | 0/100 |
|  | 26.7 | 64.7 | 1.5 | ND | 7.1 |  |
|  | 24.9 | 66.8 | 1.4 | ND | 6.9 |  |

Table 3 shows that each multilayer ceramic capacitor formed at a heating rate of 1 or 3° C./min, as in the aforementioned Publication No. 63-126117, exhibited a short circuit and/or degradation of the insulation resistance in the high-temperature loading test. In contrast, each multilayer ceramic capacitor formed at a heating rate of 5 to 20° C./min did not exhibit these defects. Thus, a heating rate of at least about 5° C./min leads to a reliable multilayer ceramic capacitor which rarely exhibiting the defects described above in the high-temperature loading test.

The results of the composition analysis of the secondary phases show that firing at heating rates of 5 to 20° C./min led to a low Ca content of about 30 mol % or less in the secondary phases. In other words, a multilayer ceramic capacitor having the secondary phases containing about 30 mol % or less of Ca does not exhibit the defects described above.

Figure 2:
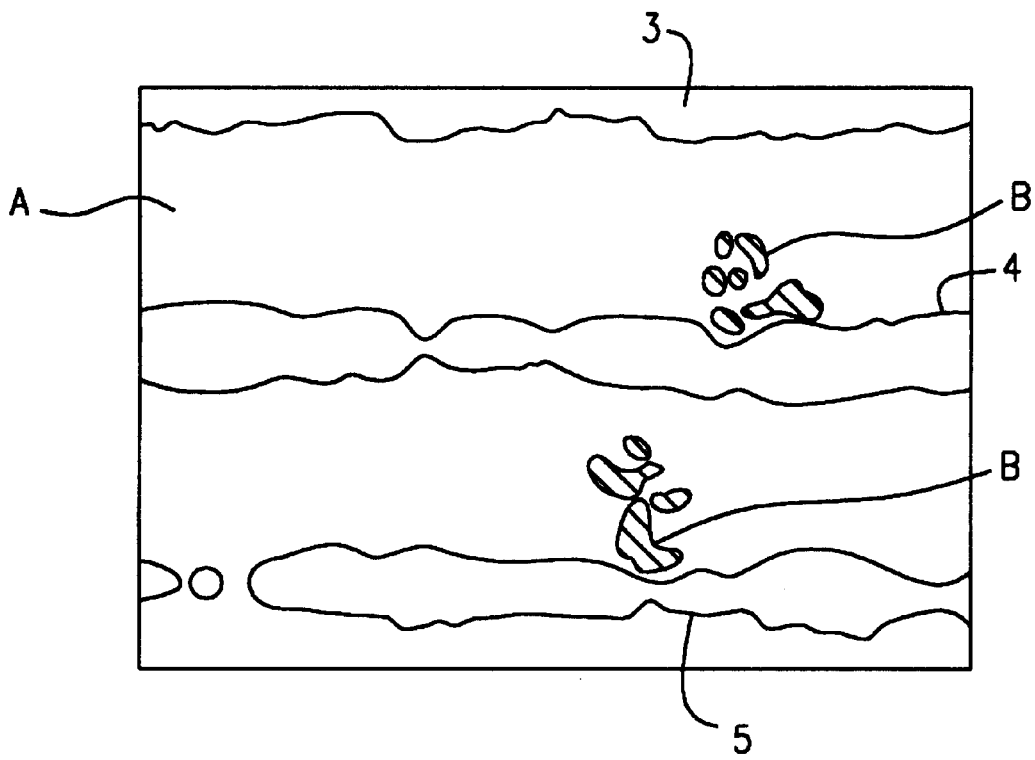
FIG. 2 is a fragmentary sectional view showing primary and secondary phases in the multilayer ceramic capacitor shown in FIG. 1.

FIG. 2 is a fragmentary sectional view showing the state of the secondary phases of the multilayer ceramic capacitor formed at the heating rate of 5° C./min. Each ceramic layer between the internal electrodes 3, 4 and 5 substantially consists of the primary crystalline phase A; however, secondary phases B appear separate F;: from the primary crystalline phase A. The Ca content of these secondary phases B are limited to about 30 mol % in the present invention.

Table 3 suggests that a heating rate of about 5° C./min or more leads to secondary phases containing about 30 mol % or less of Ca.

By limiting the Ca contents in secondary phases to about 30 mol %, a multilayer ceramic capacitor capable of preventing short circuits and degradation of the insulation resistance in a high-temperature loading test, the resulting capacitor has primary crystalline phases mainly containing $CaTiO_3$ and $CaZrO_3$ and secondary phases mainly containing Ca and Si.

Ni was used for internal electrodes in the example described above, but another base metal, such as Cu, may be used to decrease the material cost of the multilayer ceramic capacitor as well. Also, noble metals, such as Ag, Pd, and Ag-Pd, may be used for the internal electrodes in the present invention. Even using such a noble metal in the present invention, short circuit and degradation of the insulation resistance in a high-temperature loading test can be substantially prevented.

A green ceramic laminate including base metallic internal electrodes needs to be fired in a neutral atmosphere or reducing atmosphere, and this is preferable in the sintered ceramic compact according to the present invention.

The multilayer ceramic capacitor of the present invention has a primary crystalline phases mainly containing $CaTiO_3$ and $CaZrO_3$ and secondary phases mainly containing Ca and Si. The Ca contents of the secondary phases are limited to about 30 mol %, thus substantially preventing short circuits and degradation of the insulation resistance in the high-temperature loading test. This has been concluded according to the experimental results.

Accordingly, even when the $CaTiO_3/CaZrO_3$ sintered ceramic compact, which can be fired in a neutral or reducing atmosphere, has a high Ti content to thereby obtain a desired temperature characteristic, it can result in a reliable multilayer ceramic capacitor which rarely exhibits short circuits or degradation of the insulation resistance in the high-temperature loading test. Thus, various multilayer ceramic capacitors having temperature characteristics according to application can be stably supplied.

In particular, when a base metal is used for the internal electrodes, the green ceramic laminate including the internal electrodes needs to be fired in a neutral or reducing atmosphere and, therefore, the present invention is preferably applied.

In the method of manufacturing a multilayer ceramic capacitor of the present invention, the green $CaTiO_3/CaZrO_3$ ceramic laminate is fired at a heating rate of about 5° C./min or more to form the multilayer ceramic capacitor, and thus the Ca content of the secondary phases are limited to about 30 mol %, at most. The multilayer ceramic capacitor according to the present invention, therefore, can have high reliability in the high-temperature loading test.

What is claimed is:

1. A multilayer ceramic capacitor comprising
    a sintered ceramic compact comprising a primary crystalline phase comprising $CaTiO_3$ and $CaZrO_3$ and a secondary phases comprising Si and Ca; and
    a pair of spaced apart internal electrodes disposed within the sintered ceramic compact,
    wherein the amount of Ca in the secondary phase is about 30 mol % or less.

2. The multilayer ceramic capacitor according to claim 1, wherein the internal electrodes comprise a base metal.

3. The multilayer ceramic capacitor according to claim 2, wherein the base metal comprises Ni.

4. The multilayer ceramic capacitor according to claim 3 wherein the primary phase is expressed by the formula $(Ca_{1-x}Sr_x)_m(Zr_{1-y}Ti_y)O_3$, wherein x, y and m satisfy $0 \leq x \leq 0.6$, $0 \leq y \leq 0.6$, and $0.85 \leq m \leq 1.30$, respectively.

5. The multilayer ceramic capacitor according to claim 2 wherein the primary phase is expressed by the formula $(Ca_{1-x}Sr_x)_m(Zr_{1-y}Ti_y)O_3$, wherein x, y and m satisfy $0 \leq x \leq 0.6$, $0 \leq y \leq 0.6$, and $0.85 \leq m \leq 1.30$, respectively.

6. The multilayer ceramic capacitor according to claim 1, wherein the primary phase is expressed by the formula $(Ca_{1-x}Sr_x)_m(Zr_{1-y}Ti_y)O_3$, wherein x, y and m satisfy $0 \leq x \leq 0.6$, $0 \leq y \leq 0.6$, and $0.85 \leq m \leq 1.30$, respectively.

7. A method of manufacturing the multilayer ceramic capacitor according to claim 1, comprising:
    providing a green ceramic laminate comprising $CaTiO_3$ and $CaZrO_3$, $MnO_2$ and $SiO_2$, and a plurality of internal electrodes disposed therein;
    heating the green ceramic laminate at a heating rate of at least about 5° C./min up to a firing temperature, and
    firing the green laminate at the firing temperature.

8. The method of claim 7, wherein the heating rate is about 5 to 20° C./min.

9. The method of claim 8, wherein the internal electrodes comprise a base metal.

10. The method of claim 9, wherein the base metal comprises Ni.

11. The method of manufacturing the multilayer ceramic capacitor according to claim 10, including forming the green ceramic laminate by combining a main component expressed by the formula $(Ca_{1-x}Sr_x)_m(Zr_{1-y}Ti_y)O_3$, wherein $0 \leq x \leq 0.6$, $0 \leq y \leq 0.6$, and $0.85 \leq m \leq 1.30$, about 0.5 to 8 parts by weight per 100 parts of the main component of $MnO_2$ and about 0.5 to 8 parts by weight per 100 parts of the main component of glass comprising $TiO_2$ and $SiO_2$ in a total amount of about 30 to 70 mol %, and $Li_2O$, RO and $Al_2O_3$, wherein R is at least one element selected from the group consisting of Ba, Sr, Ca and Mg; and positioning internal electrodes therein.

12. The method of claim 7, wherein the internal electrodes comprise a base metal.

13. The method of claim 12, wherein the base metal comprises Ni.

14. The method of manufacturing the multilayer ceramic capacitor according to claim 13, including forming the green ceramic laminate by combining a main component expressed by the formula $(Ca_{1-x}Sr_x)_m(Zr_{1-y}Ti_y)O_3$, wherein $0 \leq x \leq 0.6$, $0 \leq y \leq 0.6$, and $0.85 \leq m \leq 1.30$, about 0.5 to 8 parts by weight per 100 parts of the main component of $MnO_2$ and about 0.5 to 8 parts by weight per 100 parts of the main component of glass comprising $TiO_2$ and $SiO_2$ in a total amount of about 30 to 70 mol %, and $Li_2O$, RO and $Al_2O_3$, wherein R is at least one element selected from the group consisting of Ba, Sr, Ca and Mg; and positioning internal electrodes therein.

* * * * *